United States Patent
Chang et al.

(10) Patent No.: US 7,970,953 B2
(45) Date of Patent: Jun. 28, 2011

(54) SERIAL ATA PORT ADDRESSING

(75) Inventors: Naichih Chang, Shrewsbury, MA (US); Pak-Iung Seto, Shrewsbury, MA (US); Luke L. Chang, Marlboro, MA (US); Victor Lau, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 11/172,768

(22) Filed: Jun. 30, 2005

(65) Prior Publication Data

US 2007/0005838 A1 Jan. 4, 2007

(51) Int. Cl.
*G06F 3/00* (2006.01)
*H04L 12/413* (2006.01)

(52) U.S. Cl. .......................................... 710/2; 370/447
(58) Field of Classification Search ....... 710/2; 711/150, 711/151
See application file for complete search history.

(56) References Cited

U.S. PATENT DOCUMENTS

| | | |
|---|---|---|
| 5,802,340 A | 9/1998 | Mallick et al. |
| 5,862,406 A | 1/1999 | Matsumoto et al. |
| 6,790,075 B1 | 9/2004 | Sung |
| 6,843,674 B1 | 1/2005 | Young |
| 6,917,992 B2 | 7/2005 | Grimsrud et al. |
| 7,093,033 B2 | 8/2006 | Beckett et al. |
| 7,171,525 B1 * | 1/2007 | Norman et al. ............... 711/150 |
| 2003/0021239 A1 | 1/2003 | Mullendore et al. |
| 2003/0236953 A1 * | 12/2003 | Grieff et al. ................... 711/151 |
| 2004/0042244 A1 * | 3/2004 | Kim et al. ....................... 365/63 |
| 2004/0073719 A1 | 4/2004 | Grimsrud et al. |
| 2004/0100944 A1 * | 5/2004 | Richmond et al. ............. 370/360 |
| 2004/0252716 A1 * | 12/2004 | Nemazie ........................ 370/447 |
| 2005/0015532 A1 | 1/2005 | Beckett et al. |
| 2005/0027894 A1 * | 2/2005 | Ayyavu et al. ..................... 710/5 |
| 2005/0138191 A1 | 6/2005 | Seto et al. |
| 2005/0138202 A1 | 6/2005 | Seto |
| 2005/0149656 A1 | 7/2005 | Seto |
| 2006/0004935 A1 | 1/2006 | Seto et al. |
| 2006/0041691 A1 | 2/2006 | Bashford et al. |
| 2006/0064568 A1 | 3/2006 | Seto et al. |
| 2006/0294286 A1 | 12/2006 | Duerk et al. |
| 2007/0002827 A1 | 1/2007 | Lau et al. |
| 2007/0005850 A1 | 1/2007 | Chang et al. |
| 2007/0005896 A1 | 1/2007 | Chang et al. |
| 2007/0006235 A1 | 1/2007 | Chang et al. |
| 2007/0011333 A1 | 1/2007 | Lau et al. |
| 2007/0011360 A1 | 1/2007 | Chang et al. |
| 2007/0067504 A1 | 3/2007 | Lau et al. |

OTHER PUBLICATIONS

Apt Technologies, Inc., et al., "Serial ATA: High Speed Serialized AT Attachment", *Revision 1.0a*, (Jan. 7, 2003),1-2, 184-236.
Dell Computer Corporation, et al., "Serial ATA II: Extensions to Serial ATA 1.0a", *Revision 1.2*, (Aug. 27, 2004),24-52.
Dell Computer Corporation, et al., "Serial ATA II: Extensions to Serial ATA 1.0a", *Revision 1.2*, (Aug. 27, 2005),103-106.

(Continued)

*Primary Examiner* — Henry W Tsai
*Assistant Examiner* — Titus Wong
(74) *Attorney, Agent, or Firm* — Blakely, Sokoloff, Taylor & Zafman LLP

(57) ABSTRACT

In one aspect, a shared transport layer frame information structure (FIS) generation logic may generate FISes for each of a plurality of SATA ports. In a further aspect, a port addressing logic, in communication with the shared transport layer FIS generation logic, may select one of the SATA ports for each of the FISes.

23 Claims, 8 Drawing Sheets

OTHER PUBLICATIONS

Grimsrud, Knut, et al., "Serial ATA Storage Architecture and Applications (Designing High-Performance, Low-Cost I/O Solutions)", *Intel Press*, ISBN 0-9717861-8-6, (2003),Entire Book.

Intel Corporation, "Comparing Serial ATA Native Command Queing (NCQ) and ATA Tagged Command Queuing (TCQ)", *The Advantage of Serial ATA Native Command Queuing*, (Oct. 2003),1-4.

SATA-IO Board Members, et al., "Serial ATA International Organization: Port Multiplier", *Revision 1.2*, (Jan. 27, 2005),1-38.

LSI Logic Corporation: "LSISASx12 3.0 Gbits/s Serial Attached SCSI Expander" Data Sheet, [Online] Feb. 3, 2005, XP002404784 USA, pp. 1-26 Retrieved from the Internet Oct. 26, 2010: URL:http://www.lsilogic.com/files/docs/techdocs/storage_stand_prod/sas/sasx12_ds.pdf.

LSI Logic Corporation: "LSISAS1064 4-Port 3Gbit/s Serial Attached SCSI Controller" Data Sheet, [Online] Mar. 29, 2005, XP002404785 USA, pp. 1-30 Retrieved from the Internet Oct. 26, 2006: URL:http://www.lsi.com/files/docs/techdocs/storage_stand_prod/sas/1064.ds.pd f>.

APT Technologies Inc et al: "Serial ATA: High Speed Serialized At Attchment (Revision 1.0a)" Internet Citation Jan. 7, 2003, XP007900985: URL:http://t13.org/docs2003/e03104r0.pdf#search=%22%%SERIAL%20ATA%HIGH%20SPEED%20SERIALIZED%22%22>.

"PCT/US2006/025461 Search Report", 1 page.

"PCT/US2006/025462 Search Report", (Nov. 14, 2006),2 pages.

"PCT/US2006/025750 Search Report", (Apr. 23, 2007),2 pages.

"PCT/US2006/025753 Search Report", 2 pages.

Dell Computer Corporation, et al., "Serial ATA II: Extensions to Serial ATA 1.0a", *Serial ATA Extensions Workgroup*, XP-002414889, (Aug. 27, 2004),pp. 22-32.

Intel Corporation, "Serial ATA II Native Command Queuing Overview, Application Note", www.intel.com/design/storage/papers/252664.htm, retrieved on Nov. 28, 2006,(Apr. 30, 2004),the whole document.

Intel Corporation, et al., "Serial ATA Native Command Queuing", XP-002428259, Joint Whitepaper by Intel Corporation & Seagate Technology,(Jul. 2003),the whole document (12 pages).

APT Technologies Inc., et al., "Serial ATA High Speed Serialized AT Attachment (Revision 1.0a)", retrieved Aug. 11, 2006 from http://t13.org/docs2003/e03104r0.pdf#search=%22%22SERIAL%20ATA%20HIGH%20SPEED%20SERIALIZED%22%22, (Jan. 7, 2003), 311 pages.

* cited by examiner

SERIAL ATA PORT ADDRESSING

BACKGROUND

1. Field

Embodiments of the invention relate to the field of computing systems architecture. More specifically, embodiments of the invention relate to the field of serial device attachment, such as, for example serial advanced technology attachment (SATA).

2. Background Information

FIG. 1 is a block diagram showing a prior art computer system architecture 100. The computer system architecture includes a host device 105, a serial advanced technology attachment (SATA) host bus adapter (HBA) 110, and a plurality of serially attached devices 192, 195, 198. The plurality of serially attached devices include a first device 192, a second device 195, and an Nth Device 198.

The SATA HBA is coupled with, or otherwise in communication with, the host device, which may representatively be a computer system. The SATA HBA includes a plurality of SATA ports 190, 193, 196. The plurality of SATA ports include a first SATA port 190, a second SATA port 193, and an Nth SATA port 196. A different port is used to attach each device.

The plurality of serially attached devices are each coupled with, or otherwise in communication with, the SATA HBA through a corresponding serial interface (SI) 191, 194, 197, such as, for example, a differential signal pair. In particular, a first serial interface 191 is coupled with the first SATA port and allows the first device to communicate with the SATA HBA, a second serial interface 194 is coupled with the second SATA port and allows the second device to communicate with the SATA HBA, and an Nth serial interface 197 is coupled with the Nth SATA port and allows the Nth device to communicate with the SATA HBA.

The host device and each of the plurality of serially attached devices may exchange data through the SATA HBA. By way of example, the attached devices may include storage devices, and the host device may exchange input and/or output data (I/O) with the storage devices. The SATA HBA typically converts the I/O data into frames and FISes (frame information structures), which may be exchanged with the attached devices over the serial interfaces.

Various SATA HBAs are known in the art. FIG. 2 is a block diagram showing pertinent components of a prior art SATA HBA 210. The SATA HBA includes a host device interface 212, a direct memory access (DMA) engine 214, a plurality of separate SATA protocol engines 216, 218, 220, and a corresponding plurality of SATA ports 290, 293, 296.

The plurality of separate SATA protocol engines includes a first SATA protocol engine 216, a second SATA protocol engine 218, and an Nth SATA protocol engine 220. The plurality of SATA ports include a first SATA port 290, a second SATA port 293, and an Nth SATA port 296. Notice that each SATA port that is supported by the SATA HBA has a corresponding SATA protocol engine. Typically, N may be sixteen.

Each of the SATA protocol engines includes a set of serial digital transport layer control logic, serial digital link layer control logic, and a serial physical interface plant. In particular, the first SATA protocol engine includes a first set of such logic 222, 228, the second protocol engine includes a second set of such logic 224, 230, and the Nth protocol engine, such as, for example, the sixteenth SATA protocol engine, includes an Nth set of such logic 226, 232.

Representative operations that may be performed by each of the serial digital transport layer control logics may include communicating with the DMA engine to exchange data with the host device, performing transport layer protocol processing, generating frames and FISes, parsing frames and FISes, and performing flow control. Additionally, the serial digital transport layer control logics are often implemented by firmware, may tend to interrupt the processor and increase latency, such as, for example, by interrupting the processor to read a tag, look up context information, etc. Still further, each of the transport layer logics may include transmit and receive buffers to store data, headers, control parameters, and the like.

Accordingly, there tends to be a substantial amount of replication of serial digital transport layer control logic across different SATA protocol engines. Such replication of logic may tend to increase the physical size and/or the cost of the SATA HBA. Additionally, in such an HBA, the DMA engine may include logic to multiplex data among the different SATA ports, and may have relatively large buffers, which may both tend to increase the complexity of the DMA engine.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 3:
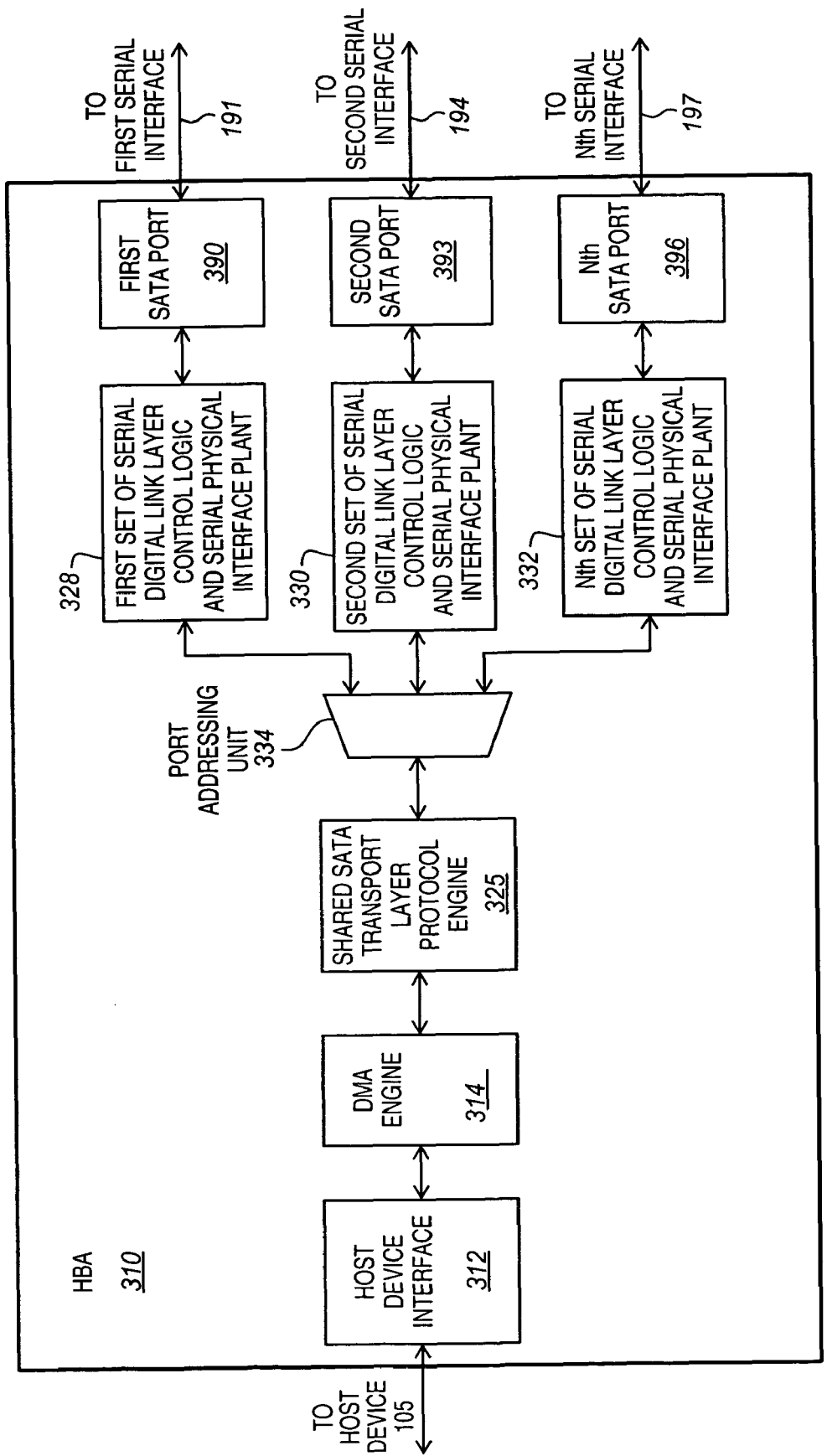
FIG. 3 is a block diagram showing a SATA HBA, according to one or more embodiments of the invention.

FIG. 3 is a block diagram showing pertinent components of a SATA HBA 310, according to one or more embodiments of the invention. SATA, which is also occasionally known as Serial ATA, is described, for example, in the document "Serial ATA: High Speed Serialized AT Attachment", Revision 1.0a, published on 7 Jan. 2003, which available from The Serial ATA International Organization (SATA-IO), as well as related standards.

The SATA HBA may act as a bridge and/or interface between a host device and an attached device and may serve as a SATA protocol controller and/or storage protocol controller. The illustrated SATA HBA includes a host device interface 312, a DMA engine 314 bi-directionally coupled with, or otherwise in bi-directional communication with, the host device interface, and a single shared SATA transport layer protocol engine 325 coupled with, or otherwise in communication with, the DMA engine. In the Figures, lines with double arrows are used to represent the possibility of bi-directional coupling and/or communication. Suitable host interfaces include, but are not limited to, universal serial bus (USB), peripheral components interconnect (PCI), PCI Express (PCIE), PCI Expansion (PCIX), and the like.

The illustrated SATA HBA further includes a port addressing unit 334 coupled with, or otherwise in communication with, the shared SATA transport layer protocol engine, a plurality of separate sets of serial digital link layer control logic and serial physical interface plant 328, 330, 332 that are each coupled with, or otherwise in communication with, the port addressing unit, and a corresponding plurality of SATA ports 390, 393, 396 that are each coupled with, or otherwise in communication with, corresponding ones of the sets.

The SATA ports include a first SATA port 390, a second SATA port 393, and an Nth SATA port 396. As shown in the illustrated embodiment, each SATA port that is supported by the SATA HBA may have a corresponding set of serial digital link layer control logic and serial physical interface plant. In particular, the first SATA port may have a corresponding first set 328 coupled or in communication therewith, the second SATA port may have a corresponding second set 330 coupled or in communication therewith, and the Nth SATA port may have a corresponding Nth set 332 coupled or in communication therewith. Each SATA port and corresponding set may represent a different SATA or serial link. By way of example, in one or more embodiments of the invention, the SATA HBA may include sixteen of such links, although the scope of the invention is not limited to any known number of links.

Figure 1:
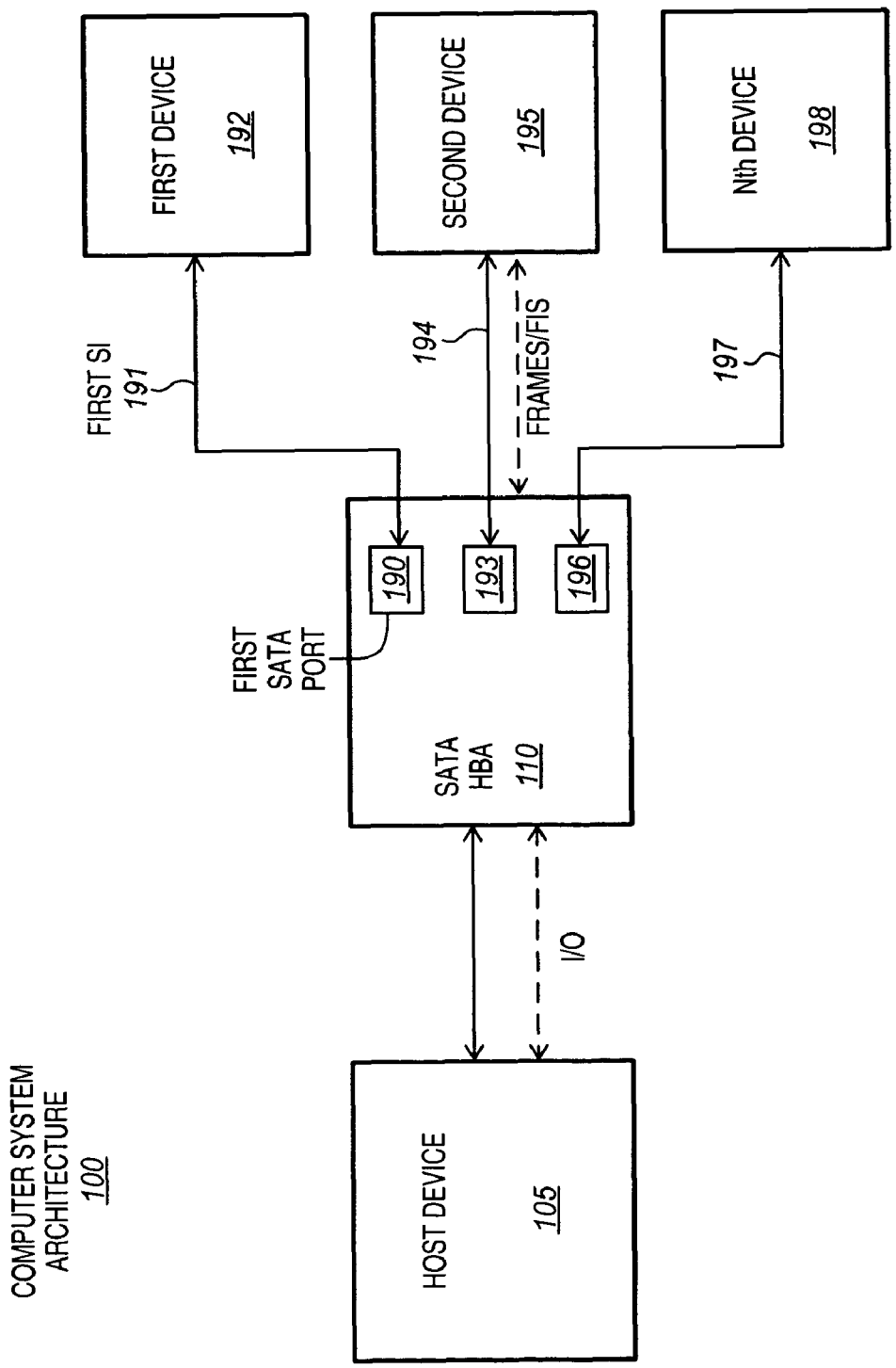
FIG. 1 is a block diagram showing a prior art computer system architecture.
Figure 2:
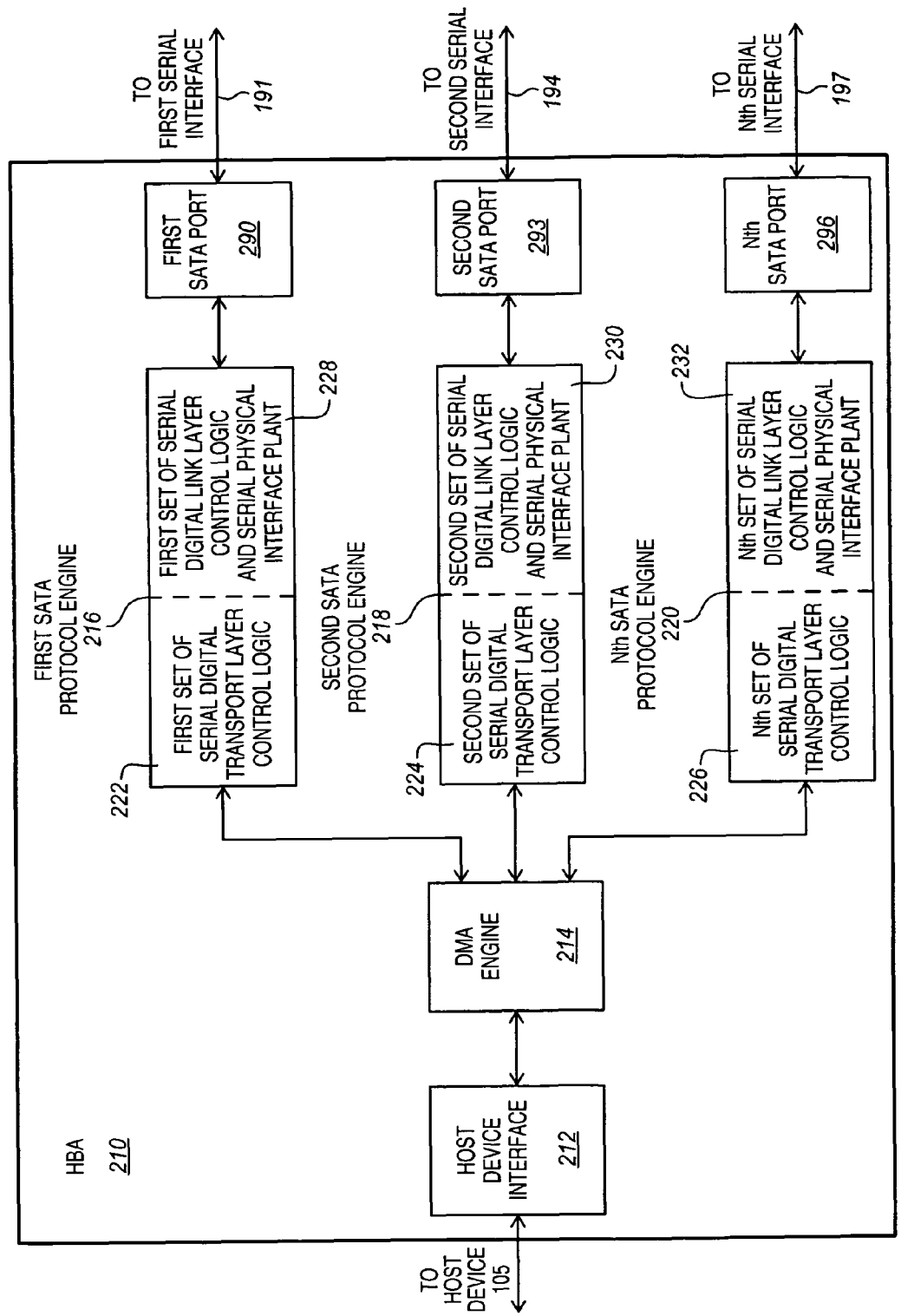
FIG. 2 is a block diagram showing a prior art SATA HBA.

As shown in the illustrated embodiment, in contrast to the SATA HBA illustrated in FIG. 2, the single shared SATA transport layer protocol engine may be shared by and may support each of the plurality of links. The shared SATA transport layer protocol engine may include logic to perform a variety of transport layer operations. As used herein, the term "logic" may include hardware, such as, for example, circuitry, software, firmware, and combinations thereof.

Typically, the shared SATA transport layer protocol engine may at least partially help to define the format and function of data structures that are exchanged between the host device and the attached device. In SATA, the data structures are often referred to as frame information structures (FISes). Representative operations that may be performed by the shared SATA transport layer protocol engine, according to one or more embodiments of the invention, include, but are not limited to, communicating with the DMA engine to exchange data with the host device, performing transport layer protocol processing for example to convert from a protocol used by the DMA engine to a protocol used by SATA, generating frames and FISes, parsing frames and FISes, performing flow control, and/or performing other well-known transport layer operations. It is not required that the shared SATA transport layer protocol engine perform all of these operations.

In any event, the single shared SATA transport layer protocol engine may perform one or more transport layer operations for each of the sets of serial digital link layer control logic and serial physical interface plant in order to support exchange of data over each of the plurality of SATA ports. Rather than substantially replicating all or the bulk of the serial digital transport layer control logic for each of the serial links, at least a portion, or substantially all, of such logic may be shared by each of the links. Reducing the amount of replication of transport layer logic within the SATA HBA may tend to offer a potential advantage of reducing the physical size and/or cost to manufacture the HBA and/or one or more integrated circuits thereof. Reducing the size may facilitate integration in small devices, such as, for example, cards, docking stations, mobile chipsets, and other confined enclosures. However, the scope of the invention is not limited with respect to achieving either or both of these advantages.

It will be appreciated by those skilled in the art that conventional or well-known logic may optionally be used to implement substantial portions of many of the above-described operations. In order to avoid obscuring the following description, detailed discussion of the conventional or well-known logic will be omitted, and the discussion below will primarily focus on the different and/or additional operations and logic of the shared SATA transport layer protocol engine.

Figure 4:
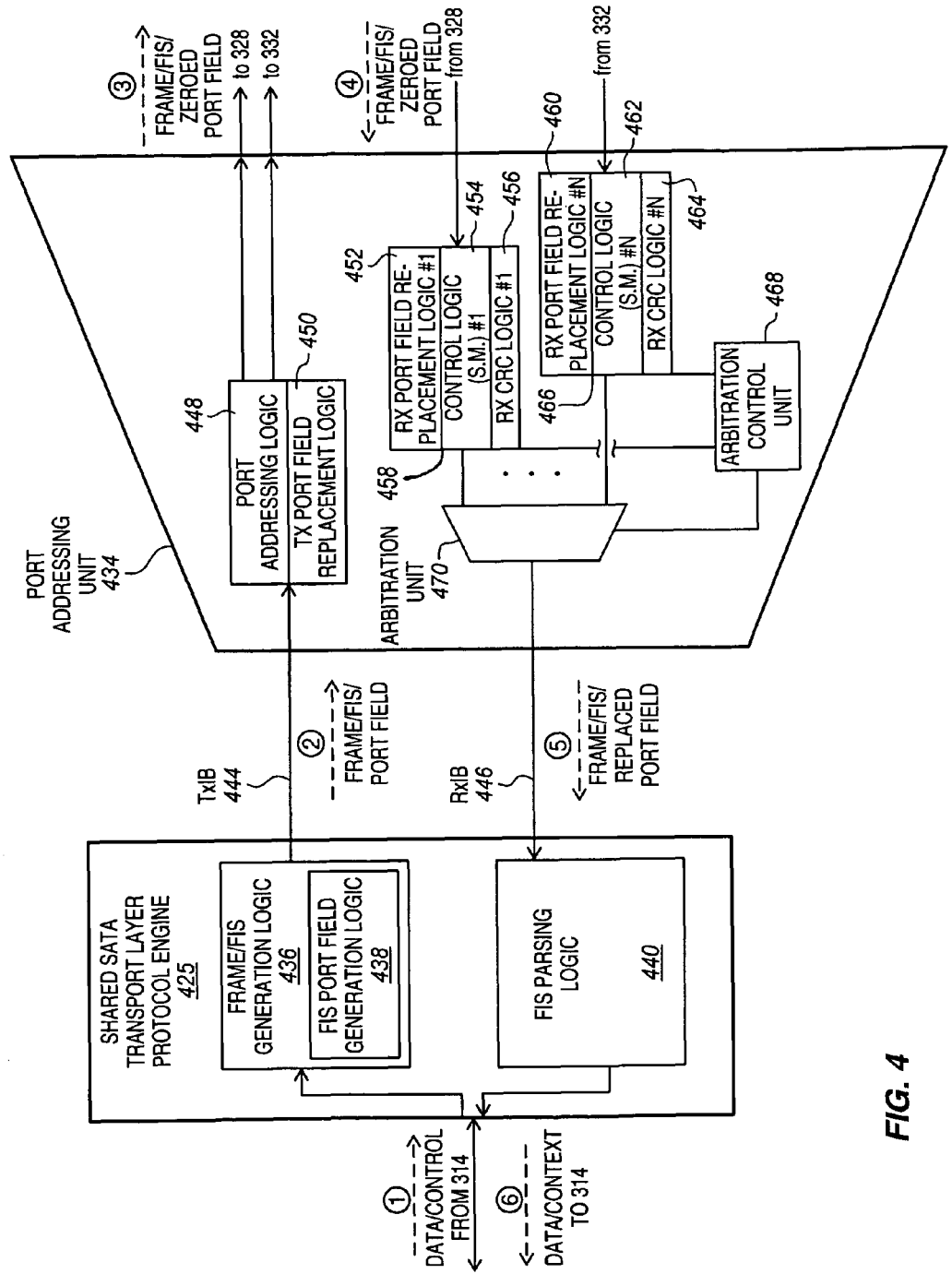
FIG. 4 is a block diagram showing a SATA transport layer protocol engine and port addressing unit, according to one or more embodiments of the invention.

FIG. 4 is a block diagram showing a SATA transport layer protocol engine 425 and port addressing unit 434, according to one or more embodiments of the invention. Numerals (1) through (6) are used to indicate a representative way in which the illustrated SATA transport layer protocol engine and illustrated port addressing unit may operate, according to one or more embodiments of the invention. In particular, the numerals are used to indicate a sequence of operations in which data from a host device may flow through the SATA transport layer protocol engine and port addressing unit to an attached device, and then response data may flow from the attached device through the SATA transport layer protocol engine and port addressing unit back to the host device.

Initially, before operating according to numerals (1) through (6), such as, for example, during setup, an HBA or other device including the SATA transport layer protocol engine and port addressing unit may communicate with a higher level, such as, for example, software or firmware at the application layer. During the communication, the HBA or other device may in essence tell the application layer that the HBA or device mimics or behaves analogous to a port multiplier. This may allow the application layer to generate FISes with port numbers that are in accordance with a current or future version of a port multiplier specification or that otherwise support a port multiplier.

As shown at numeral (1), the SATA transport layer protocol engine may receive data and context information (shown as data/context) from the DMA engine 314. According to one or more embodiments of the invention, the context information may include port addressing information. The port addressing information may include a data structure that addresses or identifies a port. In STP domain the port identification may include a Serial Attached SCSI (SAS) address, as described, for example, in Serial Attached SCSI specification 1.0, published November 2003, as well as related standards, although the scope of the invention is not so limited. Without limitation to the scope of the invention, the node context information may also representatively include other information associated with a particular node, such as, for example, disk identification, remote node queue depth, protocol specific parameters, and like information, although the scope of the invention is not limited in this respect. Application data may also optionally be included, although this is not required.

As shown, the illustrated shared SATA transport layer protocol engine may include frame and FIS (shown as frame/FIS) generation logic 436 to generate frames and FIS from the data received from the DMA engine. A frame may include an indivisible unit of information that is exchanged between a host and a device. The frame may include an SOF (Start of Frame) primitive, a FIS (Frame Information Structure), an optional cyclic redundancy check (CRC) calculated over the contents of the FIS, and an EOF (End of Frame) primitive. A FIS may include a user payload of a frame.

Such a shared SATA transport layer protocol engine may be referred to herein as a "frame and FIS generation unit", "frame and FIS generation logic", "frame and FIS generation circuit", "frame generation unit", "frame generation logic", "frame generation circuit", "FIS generation unit", "FIS generation logic", "FIS generation circuit", or the like. By way of example, a shared SATA transport layer protocol engine that generates FIS and performs protocol conversion may be referred to as a "shared protocol conversion and FIS generation unit".

As shown in the illustrated embodiment, the frame and FIS generation logic may include FIS port field generation logic 438. The port field generation logic may include logic to use the SATA port addressing information in the received context information to generate a port field in an FIS.

Table 1 shows a representative FIS including a port field, according to one or more embodiments of the invention.

TABLE 1

| Other Fields | Port Field | FIS Type Field |
| --- | --- | --- |

The particular FIS illustrated includes thirty-two bits, which as shown may be logically divided into a number of fields. The illustrated FIS includes an FIS type field, a SATA port field, and may include other fields that may comply with the SATA standards and specifications. The illustrated port field has four bits and is sufficient to uniquely identify any one of sixteen different SATA ports.

According to one or more embodiments of the invention, the FIS port field generation logic may use the SATA port addressing information in the received context information to generate a port field, such as, for example, the port field illustrated in Table 1, by populating the bit locations of the field of the FIS with bit values that correspond to the port addressed or indicated by the SATA port addressing information. By way of example, FIS port field generation logic may generate the port field "0000" if the first SATA port is addressed or identified, "0001" if the second SATA port is addressed or identified, and so on up to "1111" if the sixteenth SATA port is addressed or identified. In one or more embodiments of the invention, the port field generation logic may optionally resemble logic that the DMA engine of FIG. 2 may use to generate a port field, although the scope of the invention is not so limited.

As shown at numeral (2), The generated frames and FIS (including the generated port field) may be communicated or otherwise provided from the SATA transport layer protocol engine to the port addressing unit over a transmit internal bus or other interconnect (Tx IB) 444. As shown in the illustrated embodiment, the SATA transport layer protocol engine and port addressing unit may optionally be coupled with, or otherwise in communication with each other, by the TX IB and a receive internal bus or other interconnect (Rx IB) 446. Using separate transmit and receive buses or interconnects, rather than a shared bus or interconnect, may potentially offer increased bandwidth, although this is not required.

The port addressing unit may receive the frames, FIS, and port field generated by the shared SATA transport layer protocol engine. As shown in the illustrated embodiment, the port addressing unit may include port addressing logic 448. The port addressing logic may use the port field to address or direct, or otherwise provide, one or more corresponding frames to a SATA port that is addressed or indicated by the port field. State machines may optionally be used for this purpose, although this is not required.

As shown in the illustrated embodiment the port addressing unit may optionally include transmit (TX) port field replacement logic 450. The TX port field replacement logic may zero, clear, modify, or otherwise replace, the bits of the port field of the FIS. Some attached devices, such as, for example, older devices, may not be capable of understanding the port field. However, the replacing the bits of the port field is optional and not required.

As shown at numeral (3), in one or more embodiments of the invention, the frame and the FIS, with the optionally zeroed or otherwise replaced port field, may be communicated or otherwise provided to one of the separate sets of serial digital link layer control logic and serial physical interface plant 328, 332. In the illustrated embodiment, the frame and FIS are provided to the first set 328.

The scope of the invention is not limited to any known set of serial digital link layer control logic, serial physical interface plant, or operation performed therein. In one aspect, substantially conventional logic and operations are suitable. If desired, further details regarding representative conventional logic and operations are disclosed in the document "Serial ATA: High Speed Serialized AT Attachment", Revision 1.0a, 7 Jan. 2003, which available from The Serial ATA International Organization (SATA-IO), and which is currently available online at a page within www.serialata.org.

As shown at numeral (4), in one or more embodiments of the invention, a response frame and FIS, may be communicated from the first set 328 back to the port addressing unit.

As shown, the illustrated port addressing unit may include an arbitration unit 470 and arbitration control unit 468. The arbitration and arbitration control units may cooperate to arbitrate among the SATA ports. According to one or more embodiments of the invention, the devices attached to the SATA ports may each provide signals to the port addressing unit. The arbitration control unit may then implement a handshaking protocol that allows one of the devices to be acknowledged. Various algorithms are suitable for the handshaking or arbitration protocols, according to various embodiments of the present invention. Representative examples of suitable algorithms include, but are not limited to, round robin, weighted round robin (for example give fast attached devices more bandwidth than slow attached devices), and other algorithms known in the arts. The scope of the invention is not limited to any known such algorithm. After acknowledging one of the devices, the arbitration control unit may control the arbitration unit to enable a data exchange path that may be used to exchange data between the acknowledged device and the host device.

As shown in the illustrated embodiment, the port addressing unit may include a plurality of sets of reception logic 458, 466, which each correspond to one of the serial links. In particular, the port addressing unit may include a first set of reception logic 458 that may receive response frames and FIS from the first set of serial digital link layer control logic and serial physical interface plant, and an Nth set of reception logic 466 that may receive response frames and FIS from the Nth set of serial digital link layer control logic and serial physical interface plant.

As illustrated, the first set of reception logic may include first receive (Rx) port field replacement logic 452, first control logic 454, and optionally first receive (Rx) cyclic redundancy check (CRC) logic 456. Likewise, the Nth set of reception logic may include Nth Rx port field replacement logic 460, Nth control logic 462, and optionally Nth Rx CRC logic 464.

The response frame and FIS that are received from the first set 328 may be communicated or otherwise provided to the first set of reception logic 458. The first control logic may control the first Rx port field replacement logic to replace the cleared or otherwise modified port field of the FIS received via the first SATA port with bits sufficient to uniquely identify the first SATA port (in general the port on which the frame and FIS are received). In one or more embodiments of the invention, the control logic may include a state machine that may know that the FIS is received from a particular SATA port, and the Rx port field replacement logic may include a multiplexer that may operate under the command or control of the state machine to replace the port field. Likewise, other Rx port field replacement logics or multiplexers may replace the cleared port fields of FISes received via their respective serial links and/or SATA ports with bits that are each sufficient to uniquely identify the respective serial links and/or SATA ports under the control of their respective control logics or state machines.

The first Rx CRC 456 logic, which is optional, may perform check and/or re-generate a cyclic redundancy check on the received frame. Although not shown, in one or more embodiments of the invention, CRC generation logic may optionally be included on the transmit path through the port addressing unit 434. Alternatively, other logic, such as, for example, logic of the link layer, may alternatively include the CRC generation logic.

As shown at numeral (5), in one or more embodiments of the invention, the response frame and FIS, together with the port field that was replaced or regenerated by the port addressing unit 434, may be communicated from the port addressing unit back to the shared SATA transport layer protocol engine 425. In the illustrated embodiment, the Rx IB 446 is used to communicate the information, although as discussed above, this is not required.

The shared SATA transport layer protocol engine 425 may receive the frame and FIS, with the swapped or otherwise replaced port field. As shown, the shared SATA transport layer protocol engine may include frame and/or FIS parsing logic 440 to parse through the frame and/or FIS. The frame and/or FIS parsing logic may include logic to identify the replaced or regenerated port field and use the replaced or regenerated port field to determine the associated context information that was previously received from the DMA engine at numeral (1). That is, the shared SATA transport layer protocol engine may use the regenerated port field to identify the associated context information, which may then be used for further processing within the transport layer protocol engine. The port field of the FIS may essentially represent a unique identification for context information that may be generated by the shared SATA transport layer protocol engine on transmission, and that the shared SATA transport layer protocol engine may used to identify again the context information on reception so that the context information may be used for processing. The shared SATA transport layer protocol engine may optionally include transmit and receive buffers to store data, headers, control parameters, and the like, although this is not required.

As shown at numeral (6), response data and/or context information may be provided from the shared SATA transport layer protocol engine to the host device. This is just one possible way in which SATA transport layer protocol engines and port addressing units may operate. For the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it.

Certain conventional storage protocol devices tend to have latencies that may optionally be avoided, or at least reduced, by employing one or more embodiments of the invention that will be described next. In particular, certain conventional storage protocol devices may accept an FIS from only one attached device at a time and may allow only this one attached device to exchange data at a time. If a large amount of data is being exchanged, then all of the other devices may wait a long time before they are allowed to exchange data. Additionally, certain attached SATA devices may tend to have difficulty sustaining the SATA link bandwidth due to known limitations, such as, for example, disk access latency, disk rotational latency, and/or actuator arm latency or seek time. After transferring a chunk of data, an attached disk drive may stall the link, seek the next portion of data on the disk, rotate to the proper point to read and/or write to the disk, and prepare for getting the next chunk of data ready. Such latency may significantly decrease the overall disk drive data transfer rate. The transfer rate may potentially be degraded to around 50 to 60% on certain high-end SATA connected disk drives. Additionally, when one device experiences such latencies and stalls the link, other devices may not be able to exchange data. A further potential problem is that the host device may not be able to issue commands to the other devices when one device is exchanging a large amount of data or is latent.

Figure 5:
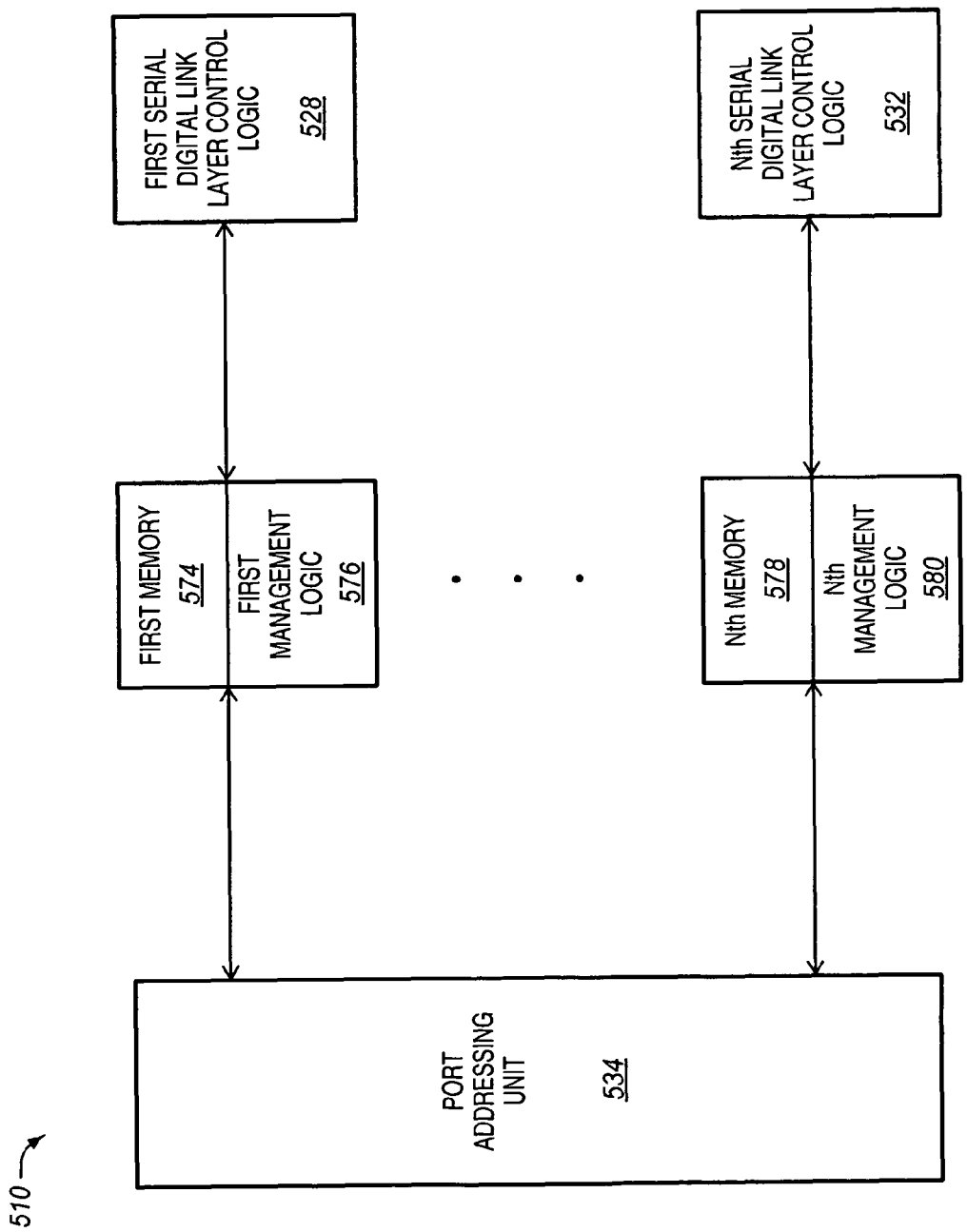
FIG. 5 is a block diagram showing a SATA HBA including small memories per SATA channel, according to one or more embodiments of the invention.

In one or more embodiments of the invention, a SATA HBA may include one or more per link small memories each between a serial digital link layer control logic and a port addressing unit to reduce such latencies. FIG. 5 is a block diagram showing a port addressing unit 534, a plurality of serial digital link layer control logics 528, 532 that each correspond to a different SATA port, and a corresponding plurality of sets of memories and memory management logics (574, 576), (578, 580) that may each store data exchanged between the port addressing unit and one each of the link layer logics, according to one or more embodiments of the invention.

The plurality of serial digital link layer control logics include a first logic 528 that may correspond to a first SATA port, and an Nth logic 532 that may correspond to an Nth SATA port. The plurality of sets of memories and memory management logics include a first set 574, 576, that may correspond to the first SATA port, and an Nth set 578, 580 that may correspond to the Nth SATA port.

The first set is logically or functionally coupled between, or otherwise in communication between, the port addressing unit and the first link layer control logic. Likewise, the Nth set is coupled between, or otherwise in communication between, the port addressing unit and the Nth link layer control logic.

The first set includes a first memory 574, and a first management logic 576 to manage the first memory. Likewise, the Nth set includes an Nth memory 578, and an Nth management logic 580 to manage the Nth memory.

In one or more embodiments of the invention, each of the memories may include a buffer. In one aspect, the buffers may include dedicated memory circuits, such as, for example, registers implemented in SRAM or DRAM, although the scope of the invention is not limited in this respect.

In one aspect, the memories or buffers may have sufficient buffer size to handle SATA/STP minimum flow control support described in one or more SATA and/or SAS-STP specifications. Often, the memories or buffers may each have from about 128 and 2048 bytes. In certain cases, the memories may have at least 256 bytes, or at least 512 bytes, to name just a few examples. In SATA, a block size is about 512 bytes. At least to a point, a larger memory may tend to reduce latency, but may tend to increase the size and/or cost of the device.

In one or more embodiments of the invention, each of the attached devices may be multiplexed to transfer data to the SATA HBA simultaneously, rather than waiting for an entire data transfer to complete on any one particular link. The memories may allow multiple, or even all, of the SATA ports to acknowledge their corresponding attached devices upon reception of FIS from the corresponding attached devices. Additionally, multiple, or even all, of the attached devices may transmit or otherwise exchange data with the SATA HBA at the same time. The data that is exchanged with the SATA HBA may be stored temporarily in the aforementioned memories, which are provided one per SATA port. This may offer potential advantages of significantly increasing bandwidth and/or significantly reducing device acknowledgement latencies, although the scope of the invention is not limited in this respect.

At an appropriate time, such as, for example, when a memory is filled, or filled to a predetermined extent, or when bandwidth is available on the Rx IB, data that is stored in the memory from the attached device may be read out of the memory and transferred from the memory to the port addressing unit. In one or more embodiments of the invention, the management logic associated with a memory may generate a data transfer request signal, such as, for example, a SATA Data FIS, and may provide the data transfer request signal to the port addressing unit as a request that the port addressing unit allow data transfer.

The port addressing unit may acknowledge the management logic and may allow data transfer. In one aspect, the port addressing unit may provide the header from the SATA Data FIS to a receive header buffer in the shared SATA transport layer protocol engine, and may provide the corresponding data, which was previously stored in the memory, to a receive data buffer in the shared SATA transport layer protocol engine.

The data transfer rate on the one or more interconnects connecting the port addressing unit and the shared SATA transport layer protocol engine, such as, for example, the Tx IB and Rx IB shown in FIG. 4, may be much greater than the serial data transfer rate of any single SATA link. Accordingly, data may typically be read from a memory to the shared SATA transport layer protocol engine at a faster rate than the data is stored in the memory from the SATA link. However, in some instances, multiple memories may become filled simultaneously. In such instances, the filled memories may await a grant for data transfer from the port addressing unit, which may potentially experience some latency. Since the memories on those SATA links are filled, there is no more storage space available to receive additional data from the corresponding attached device. In such instances, in one or more embodiments of the invention, the associated management logics may each provide a SATA flow control signal, such as, for example, a HOLD/HOLDA protocol initiation signal, to the associated link layer logic, which may then initiate a SATA flow control mechanism.

Additionally, the small memories or buffers may also allow a host device to issue commands or data to various devices when one device is in the process of exchanging data or is latent, for example. The issued commands or data may be stored in the small memories. In this way, the host device doesn't have to wait until the end of the data exchange or latency to issue commands or data to other devices.

For the purposes of explanation, numerous specific details of particular embodiments of the invention have been set forth in order to provide a thorough understanding of these embodiments of the invention. It will be apparent however, to one skilled in the art, that one or more other embodiments may be practiced without some of these specific details. As one example, in one or more alternate embodiments of the invention, only a subset of the SATA ports or a single SATA port may have a corresponding set of memory and management logic. As another example, in one or more alternate embodiments of the invention, one or more memories may be coupled to store reception data but not transmission data. Other alternate embodiments are contemplated and will be apparent to those skilled in the art and having the benefit of the present disclosure. It is emphasized that the particular embodiments described herein are not provided to limit the invention but to illustrate representative embodiments of the invention.

Now, revision 1.0a of the Serial ATA specification identified above defines the port field of the FIS as having only four bits. As discussed above, in one or more embodiments of the invention, the port field may be used to direct frames and FISes to the proper attached devices on transmission and to identify context information for frames and FISes on reception. One potential limitation that may arise when using only four bits is that the four bits may not be sufficient to uniquely identify both one of the SATA ports to which a plurality of devices are attached, such as, for example, by an external port multiplier, and also be sufficient to uniquely identify any one of the plurality of attached devices. That is, the bits may be sufficient to uniquely identify the SATA port at which the external port multiplier is attached, but may be insufficient to uniquely identify any one of a plurality of devices that are attached to the external port multiplier. Often, it may be advantageous to allow for the possibility of attaching an external port multiplier or otherwise attaching a plurality of devices at a single SATA port, although the scope of the invention is not limited in this respect.

According to one or more embodiments of the invention, addressing may be performed using a port field of an FIS and corresponding additional bits of addressing information in combination. One of these may be used for selecting a SATA port and the other may be used for selecting from a plurality of potential devices attached at the selected SATA port. Two approaches are contemplated and will be discussed in further detail below.

Figure 6:
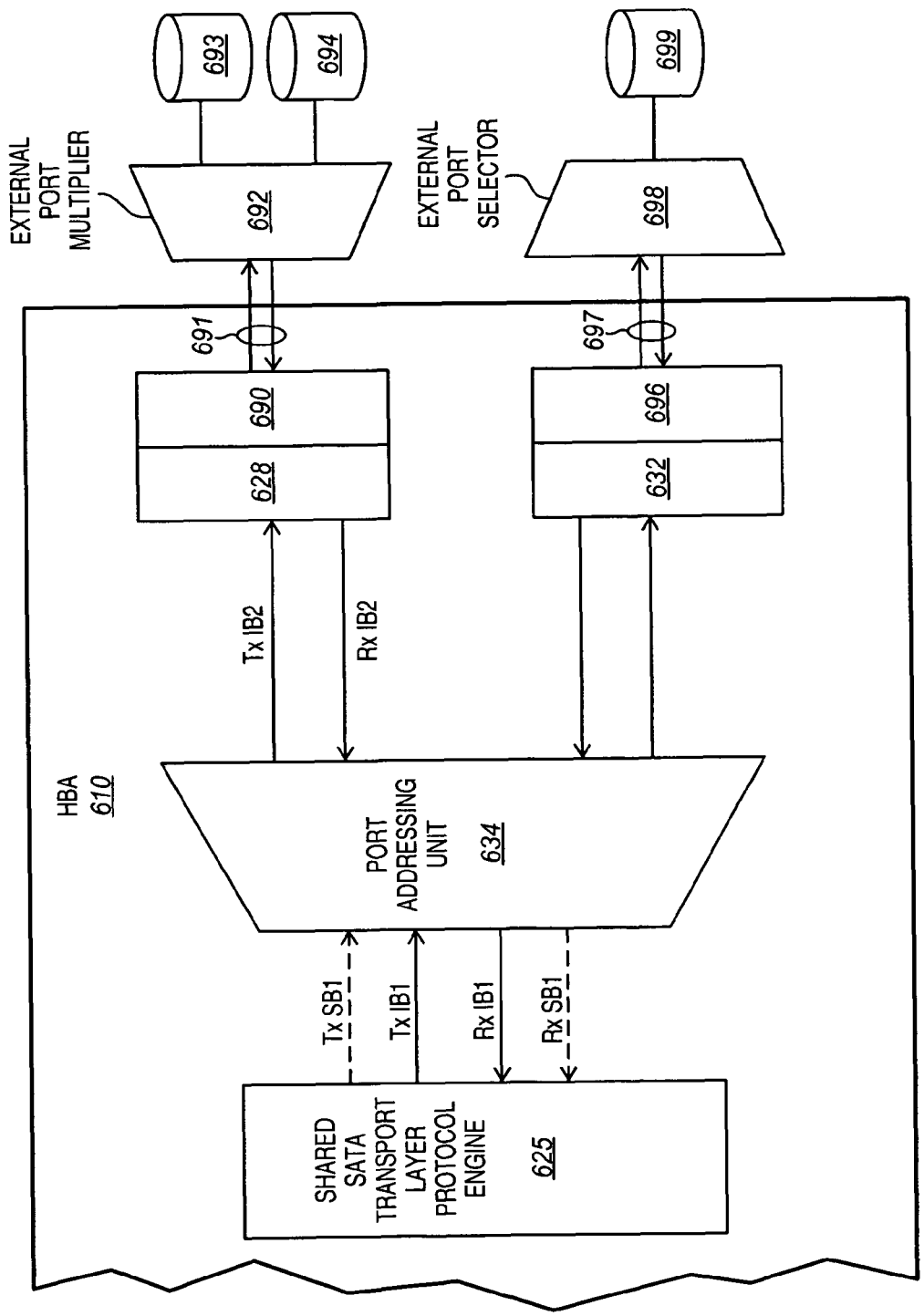
FIG. 6 is a block diagram showing a SATA HBA that uses a first approach to address by using both a port field and additional bits of addressing information, according to one or more first embodiments of the invention.

According to one approach the additional bits may be used to select a SATA port and the port field may be used to select one of a plurality of devices attached to the selected port. FIG. 6 is a block diagram showing pertinent components of a portion of a SATA HBA 610 and a plurality of external devices 692, 693, 698, 694, 699 that are attached to the SATA HBA, according to one or more embodiments of the invention.

The SATA HBA includes a shared SATA transport layer protocol engine 625 and a port addressing unit 634. The SATA HBA also includes a plurality of SATA ports including a first SATA port 690 and an Nth SATA port 696. The SATA HBA further includes a corresponding plurality of sets of serial digital link layer control logics and serial digital physical interface plants 628, 632. The plurality of sets include a first such set 628 and an Nth such set 632. The first set is coupled with, or otherwise in communication with, the first SATA port. Likewise, the Nth set is coupled with, or otherwise in communication with, the Nth SATA port. If desired, the SATA HBA may also optionally incorporate buffers or other memories similar to those shown in FIG. 5, although this is not required.

As shown, a device, such as, for example, the illustrated external port multiplier 692, may be coupled with the first SATA port via a first serial interface 691. A plurality of devices, such as, for example, a first storage device 693, and a second storage device 694, may be coupled with the external port multiplier. Likewise, a device, such as, for example, the illustrated external port selector 698, may be coupled with the Nth SATA port via an Nth serial interface 697. One or more devices, such as, for example, storage device 699, may be coupled with the port selector.

According to one or more embodiments of the invention, the shared SATA transport layer protocol engine may use information received from another device, such as, for example, context information received from a DMA engine, to generate a port field of an FIS and additional bits of addressing information. That is, the shared SATA transport layer protocol engine may at least in concept partition received addressing information into a port field of an FIS and additional bits. The shared SATA transport layer protocol engine may then provide the additional bits of addressing information in parallel with the FIS and port field to the port addressing unit.

As shown, the shared SATA transport layer protocol engine may be coupled with, or otherwise in communication with, the port addressing unit by one or more internal or FIS interconnects, such as, for example buses, and one or more sideband interconnects, such as, for example, buses. In the illustrated embodiment, these aforementioned components are coupled or communicate by a first transmit (Tx) internal bus or other interconnect (Tx IB1), a first receive (Rx) internal bus or other interconnect (Rx IB1), a first Tx sideband bus or other interconnect (Tx SB1), and a first Rx sideband bus or other interconnect (Rx SB1), although this is not required. In alternate embodiments, a shared interconnect may be used for the internal interconnect and/or the sideband interconnect.

The shared SATA transport layer protocol engine and port addressing unit may use the one or more internal or FIS interconnects to exchange frames and FIS as disclosed elsewhere herein. For example, the shared SATA transport layer protocol engine may provide frames and an FIS including a port field to the port addressing unit over the TX IB1. In addition, the shared SATA transport layer protocol engine may provide the additional bits of addressing information to the port addressing unit over the one or more sideband interconnects.

The port addressing unit may receive both the FIS including the port field and the additional bits of addressing information. In one or more embodiments of the invention, the port addressing unit may use the additional bits of addressing information to uniquely select one of a plurality of SATA ports or serial links and may provide the FIS including the port field to the selected SATA port or serial link. By way of example, after determining that the additional bits of addressing information indicates the first SATA port, the port addressing unit may provide the FIS with the port field to the first SATA port via Tx IB2.

The approaches described above may offer a potential advantage of significantly increasing the number of serial interfaces that may be supported by the SATA HBA. Since the additional bits of addressing information provided, for example, over the sideband interconnects, are internal signals, more than 4 bits may be used to select more than 16 SATA ports. For example, at least 5 bits may be used to select any of at least 32 SATA ports, or at least 6 bits may be used to select any of at least 64 SATA ports, and so on. Once a SATA port is selected the unaltered port field may be used to select one of a plurality of devices attached at the port.

As previously discussed, an alternate approach is also contemplated. In accordance with one or more embodiments of the invention, the port field may be used to select a SATA port and the additional bits may be used to select one of a plurality of devices attached to the selected SATA port.

Figure 7:
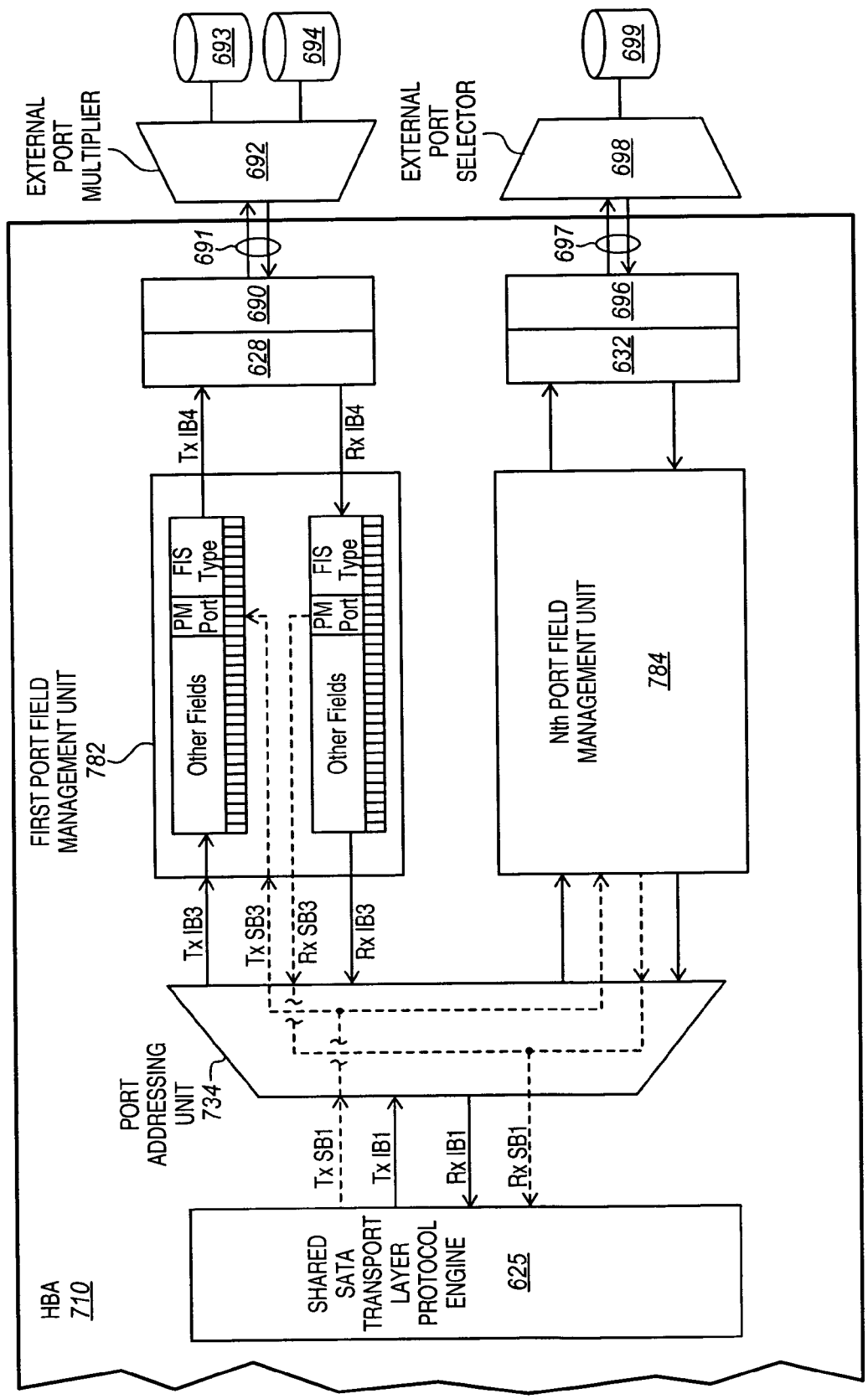
FIG. 7 is a block diagram showing a SATA HBA that uses a second approach to address by using both a port field and additional bits of addressing information, according to one or more first embodiments of the invention.

FIG. 7 is a block diagram showing pertinent components of a portion of a SATA HBA 710 including a plurality of port field management units 782, 784, according to one or more embodiments of the invention.

A first port field management unit 782 is logically or functionally coupled between, or otherwise in communication between, a port addressing unit 734 and a first set of serial digital link layer control logics and serial digital physical interface plant 628, 690. Likewise, an Nth port field management unit 784 is logically or functionally coupled between, or otherwise in communication between, the port addressing unit and an Nth set of serial digital link layer control logics and serial digital physical interface plant 632, 696.

The shared SATA transport layer protocol engine may provided FIS including port fields and additional bits of addressing information to the port addressing unit as previously described. For reasons that will be apparent further below, in one or more embodiments of the invention, the additional bits of addressing information may be four bits, or in other words the same number of bits as the port field of the FIS. This may allow the port field to be overwritten with the additional bits. However, the scope of the invention is not limited in this respect.

As shown in the illustrated embodiment, the port addressing unit may be coupled with or may communicate with each of the port field management units by one or more internal interconnects and one or more sideband interconnects. As shown in the particular illustrated embodiment, the port addressing unit may be coupled with, or may communicate with, the first port field management unit by a third transmit internal bus or other interconnect (Tx IB3), a third receive internal bus or other interconnect (Rx IB3), a third transmit sideband bus or other interconnect (Tx SB3), and a third receive sideband bus or other interconnect (Rx SB3), although this is not required. In alternate embodiments, a shared interconnect may be used for the internal interconnect and/or the sideband interconnect.

In one or more embodiments of the invention, the port addressing unit may use the port field of the received FIS to uniquely select one of the SATA ports. Then, the port addressing unit may provide the FIS including the port field used to select the SATA port to the corresponding port field management unit over an internal or FIS bus. Likewise, the port addressing unit may concurrently provide the additional bits of addressing information to the corresponding port field management unit via the corresponding sideband bus.

The port field management units may each receive the frames and FIS and the additional bits of addressing information from the port addressing unit. In one or more embodiments of the invention, the port field management units may include port field replacement logic to replace the port field of the received FIS with the corresponding additional bits of addressing information. In one particular embodiment of the invention, the logic may overwrite all four bits of the port field with four bits of the additional addressing information, although the scope of the invention is not so limited.

As shown in the illustrated embodiment, the port field management units may each be coupled with one of the sets of serial digital link layer control logic and serial physical interface plant by one or more internal interconnects. As shown in the particular illustrated embodiment, the first port field management unit 782 may be coupled with the first set of such logic by a fourth transmit internal bus or other interconnect (Tx IB4) and a fourth receive internal bus or other interconnect (Rx IB4). In alternate embodiments, a shared interconnect may be used for the internal interconnect.

The port field management units may each provide the modified FIS with the replaced or otherwise modified port field to one of the corresponding sets of serial digital link layer control logic and serial physical interface plant. The ones of the sets may each pass the FIS through the corresponding ones of the SATA ports and to the device attached to the corresponding SATA port.

As shown in the illustrated embodiment, a plurality of devices may be coupled with the SATA port via one or more intervening devices attached to the SATA port. For example, the devices 693, 694 are coupled with the first SATA port via the intervening attached external port multiplier 692. In one or more embodiments of the invention, the intervening attached device may use the port field of the received FIS, which now includes the aforementioned additional bits of addressing information, to uniquely identify and address an attached device. For example, the external port multiplier 692 may use the port field to identify and address the device 694.

The port field management units may each receive response frames and FISes from corresponding ones of the sets of serial digital link layer control logic and serial physical interface plant. By way of example, the first port field management unit may receive such frames and FISes via the Rx IB3.

In one or more embodiments of the invention, the port field management units may each include port field extraction logic to locate and extract at least some of the port field from the received FIS, and copy or otherwise provide the extracted bits to the one or more previously described sideband interconnects. For example, as shown in the illustrated embodiment, the first port field management unit may extract the four bits of the port field of the received FIS and copy or otherwise provide the four bits to the port addressing unit via the Rx SB3. The port field management units may each also provide the received FIS to the port addressing unit over the one or more previously described internal interconnects, such as, for example, Rx IB3.

The port addressing unit may receive the FISes provided over the one or more internal interconnects as well as the bits provided over the one or more sideband interconnects. The port addressing unit may then provide the FIS with the replaced or regenerated port field to the shared SATA transport layer protocol engine over the previously described one or more internal interconnects. The port addressing unit may also provide the sideband bits to the shared SATA transport layer protocol engine over the previously described one or more sideband interconnects.

The shared SATA transport layer protocol engine may receive the FIS with the port field and may receive the sideband bits. The transport layer protocol engine may include FIS parsing logic to parse the received FIS and determine the port field. The shared SATA transport layer protocol engine may also include logic to concatenate or otherwise combine the bits received from the one or more sideband interconnects and the bits of the port field to identify context information. That is, context information may be indexed by a combination of both the sideband bits and the port field. For example, the remote node index may include 10 bits, which may be a combination or concatenation of 6 bits of the side band signal, and 4 bits of the port field.

In one or more embodiments of the invention, at least some of the logic and operations of the above-described DMA engine, shared SATA transport layer protocol engine, port addressing unit, management logic, and port field management units may include hardware. Hardware may be used to manage and maintain certain fields, such as, for example, the port field of the FIS, which may be used to identify remote node context information and various SATA information, such as, for example, control/status block register, SActive register, and the like to implement protocol processing. In one aspect, this may be used to at least partially implement a hardware task context based design. The SATA hardware task context may include various information to program DMA descriptor for data transfer. Use of hardware may offer certain potential advantages over firmware, such as, for example, using less general purpose processing power. However, such a hardware implementation is not required.

Figure 8:
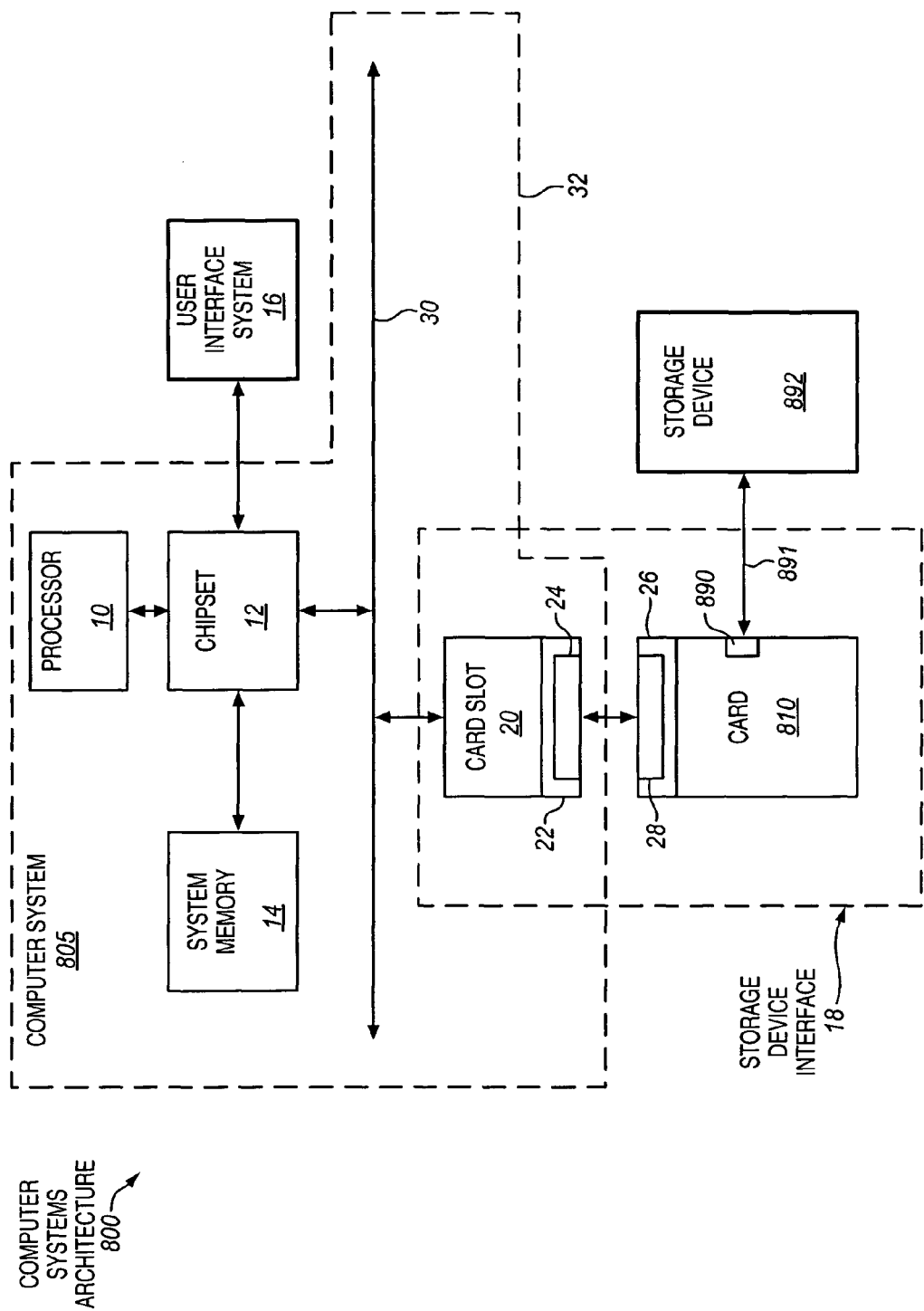
FIG. 8 is a block diagram showing a computer systems architecture, according to one or more embodiments of the invention.

FIG. 8 is a block diagram showing a computer architecture 800 including a computer system 805, a user interface system 16, a storage device 892, and a card 810 to allow the computer system to interface with the storage device, according to one or more embodiments of the invention. The computer system is one example of a suitable host device, although other host devices are also suitable. As used herein, a "computer system" may include an apparatus having hardware and/or software to process data. The computer system may include, but is not limited to, a portable, laptop, desktop, server, or mainframe computer, to name just a few examples. The computer system represents one possible computer system for implementing one or more embodiments of the invention, however other computer systems and variations of the computer system are also possible.

The computer system includes a processor 10 to process information. In one or more embodiments, the processor may include a processor in the Pentium® family of processors, such as, for example, a Pentium® 4 processor. The Pentium® family of processors are commercially available from Intel Corporation, of Santa Clara, Calif. Alternatively, other processors may optionally be used. As one example, a processor having multiple processing cores may be used. As another example, a processor manufactured and/or commercially available from a source other than Intel Corporation may optionally be used. Further, in one or more embodiments, the computer system may include multiple processors.

The processor is coupled with a chipset 12 by an interface. A system memory 14, a user interface system 16, and one or more input/output (I/O) buses or other interconnects 30, are each additionally coupled with, or otherwise in communication with the chipset by respective interfaces.

In one or more embodiments of the invention, the chipset may include one or more integrated circuits or other microelectronic devices, such as, for example, those that are commercially available from Intel Corporation. However, other microelectronic devices may also, or alternatively, be used.

In one or more embodiments of the invention, the chipset may include a first bridge/hub (not shown), such as, for example, a memory control bridge/hub available from Intel Corporation, and a second bridge/hub (not shown), such as, for example, an input/output (I/O bridge/hub available from Intel Corporation. In one or more other embodiments, at least a portion of the memory control bride/hub, such as, for example, the memory controller, may be in the same chip as the processor. The first bridge/hub may be coupled with the second bridge/hub by a hub interface. However, the scope of the invention is not limited to such chipsets.

The system memory may be coupled with, or in communication with, the memory control bridge/hub. In one or more embodiments of the invention, the system memory may include a main memory, such as, for example, a random access memory (RAM) or other dynamic storage device, to store information including instructions to be executed by the processor. Different types of RAM memory that are included in some, but not all computer systems, include, but are not limited to, static-RAM (SRAM) and dynamic-RAM (DRAM). Other types of RAM that are not necessarily dynamic or need to be refreshed may also optionally be used. Additionally, in one or more embodiments of the invention, the system memory may include a read only memory (ROM) to store static information and instructions for the processor, such as, for example, the basic input-output system (BIOS). Different types of memory that are included in some, but not all, computer systems include Flash memory, programmable ROM (PROM), erasable-and-programmable ROM (EPROM), and electrically-erasable-and-programmable ROM (EEPROM).

The one or more I/O interconnects and the user interface system may be coupled with, or otherwise in communication with, the I/O bridge/hub. Suitable I/O interconnects include, but are not limited to, peripheral component interconnect (PCI) family buses, accelerated graphics port (AGP) buses, universal serial bus (USB) buses, low pin count (LPC) buses, other kinds of I/O buses, or combinations thereof. In one particular embodiment of the invention, the one or more I/O interconnects may include a PCI, PCIX (PCI extended), and/or PCI-Express (PCI-E) bus. The chipset and the I/O bridge/hub may accordingly support standard I/O operations on one or more of such I/O interconnects.

The user interface system may representatively include devices, such as, for example, a display device, a keyboard, a cursor control device, and combinations thereof, although the scope of the invention is not limited in this respect. For example, some computer systems, such as servers, may optionally employ simplified user interface systems.

As shown in the illustrated embodiment, a storage device interface 18 may be coupled with the one or more I/O interconnects 30, such as, for example, the PCI/PCI-X bus. The one or more interconnects may be used to communicate information among components.

The illustrated storage device interface includes a card slot 20 and a card 810, such as, for example, a PCI compliant card, although the scope of the invention is not limited in this respect. The card slot is coupled with, or otherwise in communication with, the one or more I/O interconnects. The slot and the card may be constructed to permit the card to be inserted into the slot and electrically coupled with the card slot to allow the card to be coupled with, or otherwise in communication with, the one or more I/O interconnects. For example, an interface 22 of the card slot may include a bus or other interconnect connector 24 that may be electrically and mechanically mated with a mating bus or other interconnect connector 28 that may be included in an expansion slot or interface 26 of the card. When the card is properly inserted into the slot, the mating connectors may become mechanically and/or electrically coupled with each other. When the connectors are so coupled with each other, the card may become electrically coupled with the one or more I/O interconnects and may exchange data and/or commands with the system memory, the host processor, and/or other components of the computer system.

The card may include HBA logic or other computer system/device interface bridge logic as disclosed elsewhere herein in order to allow the computer system and the storage device to communicate with and/or access one another. Representatively, in one or more embodiments of the invention, the card may include one or more of shared transport layer protocol engine logic, port addressing unit logic, buffer and buffer management logic, port field management unit logic, and combinations of such logic.

The storage device may be coupled with the storage device interface, for example the card, via a communication link 891, such as, for example, a serial interface. One storage device is coupled in the illustrated embodiment, although other storage devices may also optionally be coupled with the card via additional links. Suitable storage devices include, but are not limited to, SATA devices. Suitable SATA devices include, but are not limited to, hard drives, magnetic hard drives, pluralities of hard drives, arrays of hard drives, redundant arrays of inexpensive disks boxes, CD-ROM devices, tape drives, Zip drives, SuperDisk drives, and the like. Port selectors and/or port multipliers may also optionally be coupled between the storage device and the card.

The computer system may exchange data and/or commands with the storage device via the card. In one or more embodiments of the invention, a SATA communication protocol may be used, although other communication protocols, such as, for example, SAS-STP, ATA, ATAPI, and the like, may also or alternatively be used.

Now, as shown in the illustrated embodiment, the processor, system memory, chipset, one or more I/O interconnects, and card slot may optionally be included on or otherwise connected to a single circuit board 32, such as, for example, a motherboard or backplane. The motherboard and the components connected thereto are often housed within a chassis or primary housing of the computer system. Components of the user interface system and the storage device may, in one or more embodiments, be outside of the chassis or primarily housing. The slot may represent an opening into the chassis or housing into which the card may be inserted.

However, this particular configuration is not required. Numerous alternate computer system architecture embodiments are also contemplated. For example, in various alternate embodiments of the invention, the storage device interface 18 may be either entirely internal or external to the chassis or housing of the computer system. As another example, in one or more alternate embodiments of the invention, logic similar to that described above for the card may also or alternatively be included in the chipset, such as, for example, as a chipset-integrated Advanced Host Controller Interface (AHCI) HBA. In an aspect, such an HBA may allow SATA protocol communication with one or more components within the chassis or housing of the communication system. Many additional modifications are also contemplated.

In the description and claims, the terms "coupled" and "connected," along with their derivatives, may be used. It should be understood that these terms are not intended as synonyms for each other. Rather, in particular embodiments, "connected" may be used to indicate that two or more components are in direct physical or electrical contact with each other. "Coupled" may mean that two or more components are in direct physical or electrical contact. However, "coupled" may also mean that two or more components are not in direct contact with each other, but yet still co-operate or interact with each other. For example, two or more components may be coupled with one another via one or more intervening components. In addition, two or more components may be in communication with one another if they exchange data or information, regardless of whether they are in direct contact or not.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

Certain operations may be performed by hardware components, or may be embodied in machine-executable instructions, that may be used to cause, or at least result in, a circuit programmed with the instructions performing the operations. The circuit may include a general-purpose or special-purpose processor, or logic circuit, to name just a few examples. The operations may also optionally be performed by a combination of hardware and software.

One or more embodiments of the invention may be provided as a program product or other article of manufacture that may include a machine-accessible and/or readable medium having stored thereon one or more instructions and/or data structures. The medium may provide instructions, which, if executed by a machine, may result in and/or cause the machine to perform one or more of the operations or methods disclosed herein. Suitable machines include, but are not limited to, computer systems, HBAs, motherboards, docking stations, network devices, and a wide variety of other devices with one or more processors, to name just a few examples.

The medium may include, a mechanism that provides, for example stores and/or transmits, information in a form that is accessible by the machine. For example, the medium may optionally include recordable and/or non-recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

A medium may also optionally include an electrical, optical, acoustical, radiofrequency, or other form of propagated signal, such as carrier waves, infrared signals, digital signals, for example. One or more embodiments of the invention may be downloaded as a computer program product, wherein the program may be transferred from one machine to another machine by way of data signals embodied in a carrier wave or other propagation signal or medium via a communication link (e.g., a modem or network connection).

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Such recitations do not necessarily refer to the same embodiment. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Accordingly, while the invention has been thoroughly described in terms of several embodiments, those skilled in the art will recognize that the invention is not limited to the particular embodiments described, but may be practiced with modification and alteration within the spirit and scope of the appended claims. The description is thus to be regarded as illustrative instead of limiting.

What is claimed is:

1. A host bus adapter (HBA) comprising:
   a plurality of serial advanced technology attachment (SATA) ports of the HBA; and
   a shared SATA transport layer protocol engine including (a) a single shared transport layer frame information structure (FIS) generation logic of the HBA that is shared and used by each of the plurality of SATA ports, the single shared transport layer FIS generation logic to generate FISes for each of the plurality of SATA ports, the single shared transport layer FIS generation logic including logic that is coupled with each of the plurality of SATA ports, and (b) a shared transmit buffer that is shared by the plurality of SATA ports and to store one or more of data, headers, and control parameters for the plurality of SATA ports; and
   a single shared port addressing logic, coupled to the single shared transport layer FIS generation logic, to receive the FISes, and to address each of the FISes to a respective one of the plurality of SATA ports.

2. The HBA of claim 1, further comprising:
   a first memory in communication between the single shared port addressing logic and a first serial digital link layer control logic to perform processing for a first SATA port of the plurality of SATA ports; and
   a second memory in communication between the single shared port addressing logic and a second serial digital link layer control logic to perform processing for a second SATA port of the plurality of SATA ports.

3. The HBA of claim 2, wherein the first and second memories each comprise buffers sufficient to handle SATA/STP flow control.

4. The HBA of claim 1:
   wherein the single shared port addressing logic is coupled with the single shared transport layer FIS generation logic by one or more interconnects to receive the FISes; and wherein the single shared port addressing logic is coupled with the single shared transport layer FIS generation logic by one or more sideband interconnects to receive additional addressing information corresponding to each of the FISes.

5. The HBA of claim 4, wherein the single shared port addressing logic comprises logic to address each of the received FISes to one of the SATA ports based on the additional addressing information.

6. The HBA of claim 5, wherein the additional addressing information comprises at least five bits to allow any one of at least 32 SATA ports to be uniquely selected.

7. The HBA of claim 4, further comprising a port field management logic that is in communication with the port addressing logic to receive a FIS and corresponding additional addressing information, wherein the port field management logic is to perform processing for a SATA port indicated by a port field of the received FIS, and wherein the port field management logic comprises logic to modify the port field based on the received additional addressing information.

8. An apparatus to be included in a host bus adapter (HBA) comprising:
  a shared transport layer frame information structure (FIS) port field generation logic, which is to be shared by each of a plurality of serial advanced technology attachment (SATA) ports of the HBA, to generate a port field for each of a plurality of FISes, each of the plurality of FISes to be provided to a respective one of the SATA ports, wherein the shared transport layer FIS port field generation logic does not include logic that is replicated for each of the plurality of SATA ports;
  a shared transmit buffer of a SATA transport layer protocol engine to store one or more of data, headers, and control parameters, the shared transmit buffer shared by the plurality of SATA ports; and
  a port addressing logic, coupled to the shared transport layer FIS port field generation logic, to receive the FISes, and to address each of the FISes to one of the SATA ports.

9. The apparatus of claim 8, further comprising:
  a first memory in communication between the port addressing logic and a first SATA port of the plurality of SATA ports; and
  a second memory in communication between the port addressing logic and a second SATA port of the plurality of SATA ports.

10. The apparatus of claim 8:
  wherein the port addressing logic is coupled with the shared transport layer FIS port field generation logic by one or more interconnects to receive the FISes and by one or more sideband interconnects to receive additional bits of addressing information for each of the FISes;
  wherein the port addressing logic comprises logic to address the FISes to the SATA ports by using the additional bits of addressing information.

11. A method performed within a host bus adapter (HBA), the method comprising:
  receiving a first and second context information at a single shared transport layer logic of the HBA that is used by each of, and coupled with each of, a plurality of serial advanced technology attachment (SATA) ports;
  generating a first port field of a first frame information structure (FIS) that indicates a first SATA port of the HBA based on the first context information with the single shared transport layer logic;
  generating a second port field of a second FIS that indicates a second SATA port of the HBA based on the second context information with the single shared transport layer logic; and
  receiving a first data from the first SATA port and storing the first data in a shared receive buffer of the shared transport layer logic, and receiving a second data from the second SATA port and storing the second data in the shared receive buffer of the shared transport layer logic;
  providing the first and second FISes to a port addressing unit.

12. The method of claim 11, further comprising:
  generating additional bits of addressing information, in addition to the first port field, by using the first context information, with the single shared transport layer logic; and
  providing the additional bits of addressing information to the port addressing unit.

13. The method of claim 11, further comprising:
  providing the first and second FISes from the port addressing unit to a first and second buffer, respectively;
  storing the first and second FISes in the first and second buffers, respectively; and
  after said storing the first and second FISes, providing the first and second FISes to first and second serial digital link layer control logics, respectively.

14. A host bus adapter (HBA) comprising:
  a plurality of serial advanced technology attachment (SATA) ports;
  a common, shared transport layer frame information structure (FIS) generation logic that is coupled with and shared by each of the plurality of SATA ports, the common, shared transport layer FIS generation logic to generate FISes for each of the plurality of SATA ports; and
  a shared receive buffer of a SATA transport layer protocol engine that is to receive data from each of the plurality of SATA ports and to store the data;
  a port addressing logic, coupled to the common, shared transport layer FIS generation logic, to receive the FISes, and to address each of the FISes to a respective one of the SATA ports.

15. The HBA of claim 14 further comprising:
  a first memory in communication between the port addressing logic and a first serial digital link layer control logic that corresponds to a first SATA port; and
  a second memory in communication between the port addressing logic and a second serial digital link layer control logic that corresponds to a second SATA port.

16. The HBA of claim 14:
  wherein the port addressing logic is coupled with the shared transport layer FIS generation logic by one or more interconnects to receive the FISes; and
  wherein the port addressing unit is coupled with the shared transport layer FIS generation logic by one or more sideband interconnects to receive additional addressing information corresponding to each of the FISes.

17. The HBA of claim 14, wherein the port addressing logic comprises logic to address each of the received FISes to one of the SATA ports based on the additional addressing information.

18. The HBA of claim 17, wherein the additional addressing information comprises at least five bits to allow any one of at least 32 different SATA ports to be selected.

19. The HBA of claim 14, further comprising a device other than a port multiplier attached to a sixteenth SATA port.

20. The HBA of claim 1, wherein the shared transport layer FIS generation logic is operable to communicate with a DMA engine to exchange data with a host device and perform transport layer protocol processing.

21. The HBA of claim 1, wherein the shared transport layer FIS generation logic does not comprise FIS generation logic that has been replicated for each of the SATA ports.

22. The apparatus of claim 8, wherein the shared transport layer FIS port field generation logic comprises a single shared transport layer FIS port field generation logic.

23. The HBA of claim 14, further comprising a host device comprising a dynamic random access memory (DRAM) memory coupled with the HBA.

* * * * *